United States Patent
Zhang (10) Patent No.: US 11,602,224 B2
(45) Date of Patent: Mar. 14, 2023

(54) HEADREST DEVICE AND CHAIR HAVING THE SAME

(71) Applicant: Xiaozhao Zhang, Chuzhou (CN)

(72) Inventor: Xiaozhao Zhang, Chuzhou (CN)

( * ) Notice: Subject to any disclaimer, the term of this patent is extended or adjusted under 35 U.S.C. 154(b) by 0 days.

(21) Appl. No.: 17/361,567

(22) Filed: Jun. 29, 2021

(65) Prior Publication Data

US 2022/0202188 A1    Jun. 30, 2022

(30) Foreign Application Priority Data

Dec. 31, 2020 (CN) .......................... 202023343473.1

(51) Int. Cl.
| | | |
|---|---|---|
| A47C 1/035 | (2006.01) | |
| A47C 1/032 | (2006.01) | |
| A47C 7/38 | (2006.01) | |
| A47C 17/04 | (2006.01) | |
| B60N 2/853 | (2018.01) | |

(52) U.S. Cl.
CPC ................ *A47C 7/38* (2013.01); *A47C 17/04* (2013.01); *B60N 2/853* (2018.02)

(58) Field of Classification Search
CPC ...... A47C 1/036; A47C 1/03294; B60N 2/815
See application file for complete search history.

(56) References Cited

U.S. PATENT DOCUMENTS

| | | | | |
|---|---|---|---|---|
| 4,691,961 A | * | 9/1987 | Rogers, Jr. ............. | A47C 1/036 297/396 |
| 5,112,109 A | * | 5/1992 | Takada ................. | B60N 2/2222 297/343 |
| 6,910,740 B2 | * | 6/2005 | Baker .................... | B60N 2/815 297/391 |
| 7,201,438 B2 | * | 4/2007 | Reinsch .................. | A47C 7/38 297/61 |
| 7,997,654 B2 | * | 8/2011 | Ferry .................. | B64D 11/0606 297/344.17 |
| 9,155,388 B2 | * | 10/2015 | Robertson .............. | A47C 1/032 |
| 10,334,951 B2 | * | 7/2019 | Robertson ............ | A47C 1/0355 |
| 2004/0217640 A1 | * | 11/2004 | Kreitler .................. | B60N 2/818 297/404 |
| 2014/0103688 A1 | * | 4/2014 | Wilson ...................... | A47C 7/46 297/284.7 |
| 2014/0312660 A1 | * | 10/2014 | Natuzzi ................ | A47C 1/0342 297/61 |
| 2017/0347797 A1 | * | 12/2017 | Robertson ............ | A47C 1/0242 |
| 2017/0360202 A1 | * | 12/2017 | Robertson .............. | A47C 1/036 |
| 2022/0202188 A1 | * | 6/2022 | Zhang ...................... | A47C 7/38 |

* cited by examiner

*Primary Examiner* — Shin H Kim (57) ABSTRACT

A headrest device and a chair having the same are provided. The headrest device includes a support frame, a headrest component and a reset member. The support frame is pivotally connected with the headrest component, and the reset member is connected with the headrest component and configured to drive the headrest component to rotate relative to the support frame. The support frame is provided with a limiting convex block, and the limiting convex block can stop a rotation of the headrest component when the headrest component moves to an initial limiting position.

16 Claims, 5 Drawing Sheets

HEADREST DEVICE AND CHAIR HAVING THE SAME

CROSS-REFERENCE TO RELATED APPLICATIONS

This application claims all benefits accruing under 35 U.S.C. § 119 from China Patent Application No. 202023343473.1, filed on Dec. 31, 2020, titled "HEADREST DEVICE AND CHAIR HAVING THE SAME" in the China National Intellectual Property Administration, the content of which is hereby incorporated by reference.

TECHNICAL FIELD

The present disclosure generally relates to chairs, and in particular, to a headrest device and a chair having the same.

BACKGROUND

At present, a headrest is often used in a sofa, a chair and other sitting instruments, to support a head or a neck of a human body, which can improve a comfort when the human body rests on the sitting instrument. Some intelligent furniture generally has a function of electronically controlling a movement of the headrest, electronically controlling an adjustment of a supporting angle of the head or the neck of the human body, and electronically controlling a switch of a supporting form and a folded form of the headrest.

In a conventional headrest device, a limiting structure is disposed to limit a motion range and a limiting position of the conventional headrest device. However, the limiting structure has a complex shape, which leads to inconvenience in processing and assembly of parts of the conventional headrest device. Moreover, a strength of the limiting structure is insufficient. After repeated reciprocating movements of the headrest device, the limiting structure can be damaged or fail. Therefore, a reliability from long-term use of the headrest device is poor, resulting in safety risks.

SUMMARY

The present disclosure provides a headrest device including a support frame, a headrest component and a reset member. The support frame is pivotally connected with the headrest component, and the reset member is connected with the headrest component and configured to drive the headrest component to rotate relative to the support frame. The support frame is provided with a limiting convex block fixed to the support frame, and the limiting convex block can stop a rotation of the headrest component when the headrest component moves to an initial limiting position.

In some embodiments, the head rest component includes a first connecting portion pivotally connected with the support frame and a second connecting portion connected with the reset member, and the first connecting portion and the second connecting portion are relatively fixed with each other. The headrest component is in contact with the limiting convex block by the first connecting portion or the second connecting portion, the first connecting portion can slide contact with the limiting convex block, and the second connecting portion can be in contact with the limiting convex block and fixed relative to the limiting convex block when the headrest component moves to the initial limiting position.

In this way, the limiting convex block and the headrest component are always in contact. In a rotation process of the headrest component, a force of the headrest component acting on the limiting convex block is smaller and the rotating is smoother, so as to avoid an impact of the headrest component on the limiting convex block, preventing a breaking of the limiting convex block or a loosening of the limiting convex block relative to the support frame. Even if the headrest component reciprocates for many times, the limiting convex block will not be damaged.

In some embodiments, the first connecting portion is provided with a cambered surface configured to slide contact with the limiting convex block. The second connecting portion is provided with an abutting surface and the headrest component is in contact with the limiting convex block by the abutting surface in the initial limiting position.

In this way, the first connecting portion and the limiting convex block can move relative to each other and smoothly with low resistance, which reduces the force of the headrest component acting on the limiting convex block. The cambered surface is in linear contact with the limiting convex block, and a fatigue damage of the limiting convex block will not occur even if the headrest component reciprocates for many times.

In some embodiments, the abutting surface is planar, and the abutting surface is connected with and tangent to the cambered surface.

In this way, in the rotation process of the headrest component relative to the support frame, a contact area between the headrest component and the limiting convex block gradually has a transition from the cambered surface to the abutting surface, resulting in further reducing the force of the headrest component acting on the limiting convex block.

In some embodiments, the limiting convex block is further provided with a flexible layer and the flexible layer is in contact with the headrest component.

In this way, the flexible layer can further cushion the force from the headrest component, improve a durability of the headrest component, and reduce an impact noise when the headrest component moves to the initial limiting position.

In some embodiments, the limiting convex block is fixed on the support frame by a welding process, or, the limiting convex block is inserted in and fixed to the support frame.

In this way, a connection between the limiting convex block and the support frame is better and a connecting strength of the connection is greater.

In some embodiments, a position of the limiting convex block is adjustable on the support frame.

In this way, a position where the limiting convex block stops the headrest component can be adjusted according to habits of different users or user groups with different shapes and ages, respectively. In other words, the initial limiting position of the headrest component relative to the support frame can be adjustable, resulting in a stable support height and a stable support angle of the headrest component being adjustable.

In some embodiments, the reset member can be a telescopic spring, an end of the reset member is provided with a hook portion, and the headrest component is provided with a hook hole for the hook portion to penetrate through.

In this way, a connection between the reset member and the headrest component is more convenient, easy to operate, and the connection between the reset member and the headrest component is reliable and not easy to loosen and fail.

In some embodiments, the headrest device further includes a driving component disposed on the support frame, and the driving component is connected with the headrest component and configured to drive the headrest component to rotate relative to the support frame.

In this way, the headrest device can adjust at least one of a lifting height and a lifting angle of the headrest component by an electronically controlling driving mode, improving a practical convenience for the user.

The present disclosure further provides a chair including a chair backrest and the headrest device as described above, and the headrest device is fixed to the chair backrest by the support frame.

The present disclosure provides the headrest device. The headrest device can block and stop the headrest component which moves to the initial limiting position by the limiting convex block, and a blocking effect of the limiting convex block is better. The headrest component can more stably abut against the limiting convex block, so as to provide a stable and safe lifting support for the head of the user. Compared with the limiting structure of the conventional headrest device, the limiting convex block is not easy to break off, crush and then fail, and has a better reliability. Structures of the headrest component and the support frame are simpler, parts of the headrest component and the support frame are easier to form, and an assembly of the headrest component and the support frame is more convenient, resulting in a production cost of the headrest device being lower.

In the figures, 100 represents a headrest device, 10 represents a support frame, 11 represents a boundary beam; 12 represents a bottom beam, 13 represents a pivot seat, 20 represents a headrest component, 21 represents a first connecting portion, 211 represents a cambered surface, 22 represents a second connecting portion, 221 represents an abutting surface, 23 represents a mounting portion of a headrest plate, 30 represents a reset member, 31 represents a hook portion; 32 represents a hook hole; 40 represents a limiting convex block, 50 represents a transmission member, 51 represents a first driving motor, 511 represents a motor body, 512 represents an output shaft.

DETAILED DESCRIPTION OF THE EMBODIMENT

The technical solutions in the embodiments of the present disclosure are clearly and completely described in the following with reference to the accompanying drawings in the embodiments of the present disclosure. It is obvious that the described embodiments are only a part of the embodiments, but not all of the embodiments. All other embodiments obtained by those skilled in the art based on the embodiments of the present disclosure without departing from the inventive scope are the scope of the present disclosure.

Unless otherwise defined, all technical and scientific terms used herein have the same meaning as a skilled person in the art would understand. The terminology used in the description of the present disclosure is for the purpose of describing particular embodiments and is not intended to limit the disclosure.

The present disclosure provides a headrest device 100 and a chair having the same. The headrest device 100 is configured to cushion under the head or the neck of the user. When the user rests on the chair in a lying posture or a sitting posture, the headrest device 100 can provide more support and improve a comfort for the user. It can meet the requirements of the user in some special situations that adjusting a height or an angle of a headrest relative to a chair backrest, such as reading while lying down.

The following is a detailed introduction of the headrest device 100 in an embodiment of the present disclosure. The headrest device 100 in this embodiment is used in the chair and disposed on the chair backrest.

It can be understood that in other embodiments, the headrest device 100 can also be used in other types of sitting furniture, such as a leisure chair, a car seat, a bed chair, a single sofa or a row of sofas for disabled or infirm people to use.

Referring to FIG. 1 to FIG. 8, the headrest device 100 in the present disclosure includes a support frame 10, a headrest component 20, a driving component, a reset member 30 and a transmission member 50. The support frame 10 is disposed on the chair backrest, and the headrest component 20 is connected with the support frame 10, the reset member 30 and the transmission member 50, respectively. The driving component is disposed on the support frame 10, and connected with the transmission member 50.

The driving component can drive the headrest component 20 to rotate relative to the support frame and lift a support height of the headrest component 20 to the head of the user, resulting in adapting to a use state of the user when reading as shown in FIG. 6 to FIG. 9. When the driving component stops operating, the reset component 30 can drive the headrest component 20 to move relative to the support frame 10 and reduce the support height of the headrest component 20 to the head, resulting in adapting to a use state of the user when resting as shown in FIG. 1 to FIG. 5.

The support frame 10, as a mounting base of the headrest component 20 and the drive component, is configured to determine a mounting position of the headrest device 100 on the chair. The support frame 10 includes a boundary beam 11 and a bottom beam 12 fixed with each other. The boundary beam 11 is configured to connect with the headrest component 20 and the bottom beam 12 is configured to dispose the drive component.

Specifically, the boundary beam 11 can be a bent rod. A bent shape of the bent rod matches a shape of back and shoulders of the user. The bottom beam 12 can be a straight rod extending along a width of the chair backrest. A number of the boundary beam 11 can be two. The two boundary beams 11 can extend along a height of the chair backrest and be fixedly connected with both ends of the bottom beam 12, respectively. The boundary beam 11 is perpendicular to the bottom beam 12, resulting in the supporting frame 10 forming a rectangular frame structure with an opening in a whole. Therefore, the support frame 10 can be coordinated with the chair backrest to provide support for the back and the shoulders of the user.

In order to decrease a weight of the headrest device 100 and the chair, the support frame 10 can be a wood material. It can be understood that in other embodiments, the support frame 10 can be other materials.

As an executive component of the headrest device 100, the headrest component 20 is configured to support the head and the neck of the user. By controlling a movement of the headrest component 20 relative to the support frame 10, the user can change the angle and a position of the headrest component 20 relative to the chair backrest, so as to change a height and an angle of the head, resulting in improving the comfort when using the headrest device 100.

Specifically, the headrest component 20 includes a headrest plate (not shown), a mounting portion 23 of the headrest plate, a first connecting portion 21 and a second connecting portion 22. The mounting portion 23 of the headrest plate is configured to mount the headrest plate. The first connecting portion 21 is configured to connect with the boundary beam 11 and the second connecting portion 22 is configured to connected with the reset member 30.

The first connecting portion 21 and the boundary beam 11 are provided with through holes, respectively. Pivots can penetrate through the through holes. The through holes of the first connecting portion 21 and the boundary beam 11 are disposed coaxially. The second connecting portion 22 is a panel protruding outward from an outer edge of the first connecting part 21, and a side away from the first connecting portion 21 of the second connecting portion 22 is connected with the reset member 30. The mounting portion of the headrest plate 23 is bent upward to form a support plate. The support plate faces to the head of the user and is configured to fit and fix with the headrest plate, mainly bearing a weight of the head of the user.

Figure 1:
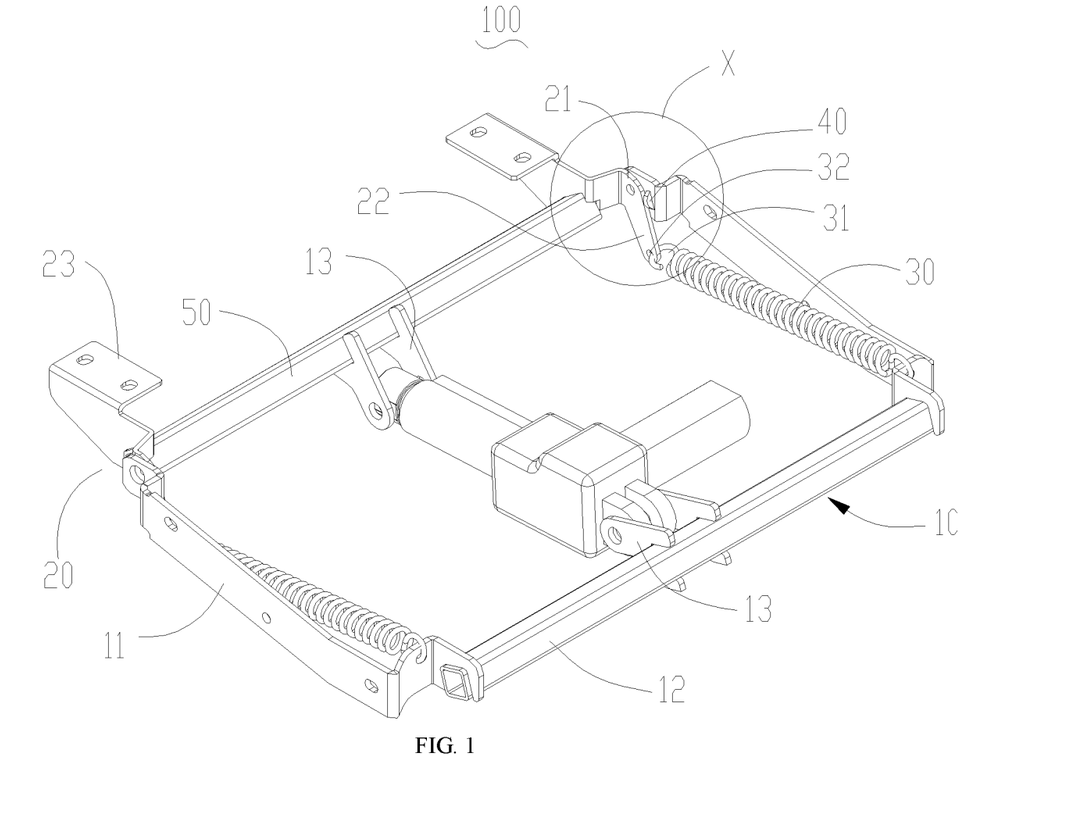
FIG. 1 is a structural schematic view of a headrest device in an embodiment of the present disclosure.
Figure 2:
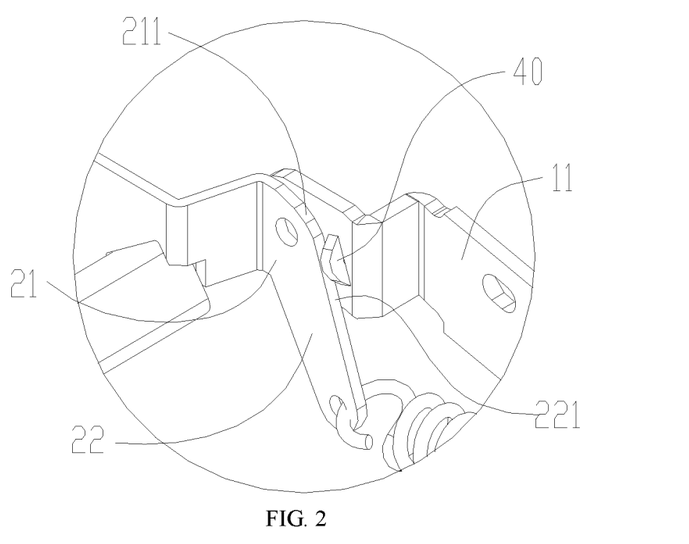
FIG. 2 is a partial enlargement schematic view of X part of the headrest device of FIG. 1.
Figure 3:
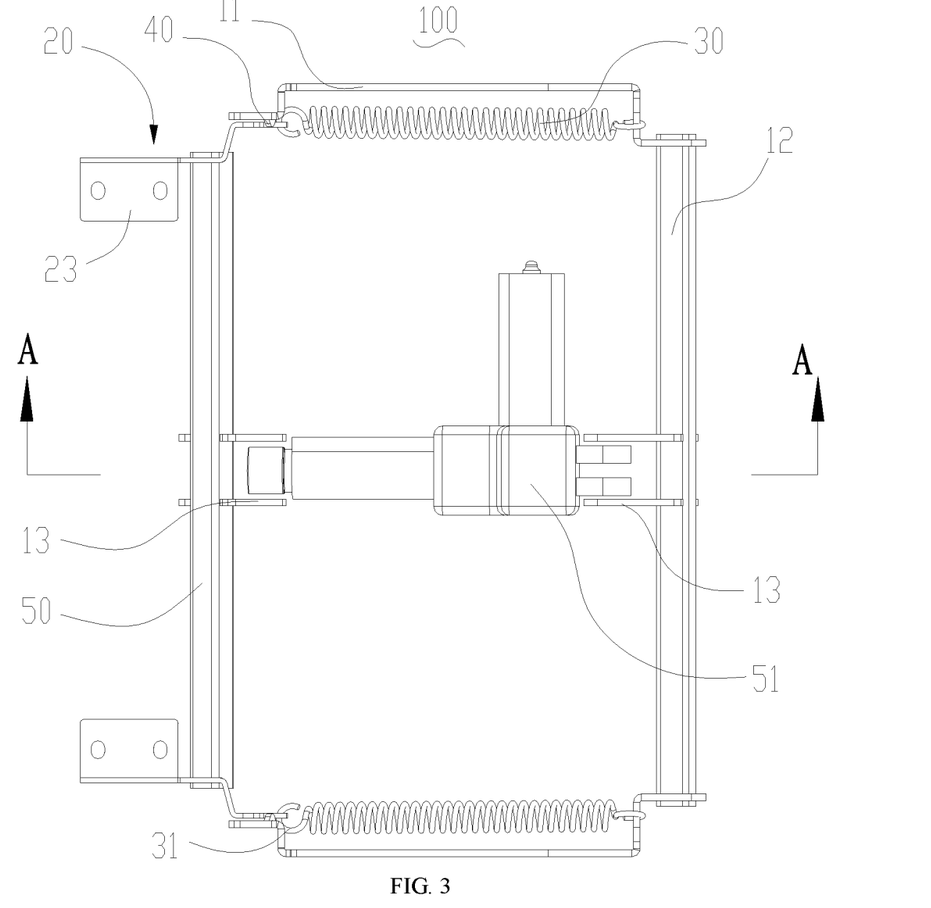
FIG. 3 is a structural schematic view of the headrest device of FIG. 1 with a first viewing angle.
Figure 4:
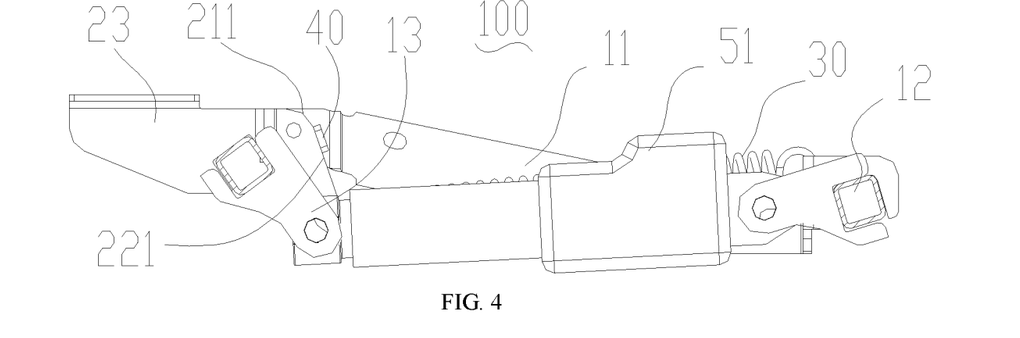
FIG. 4 is a schematic view of the headrest device along the A-A plane of FIG. 3.
Figure 5:
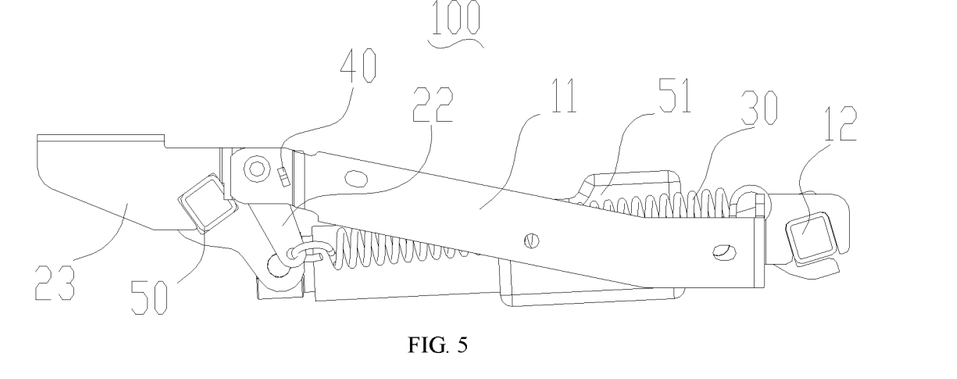
FIG. 5 is a structural schematic view of the headrest device of FIG. 1 with a second viewing angle.
Figure 6:
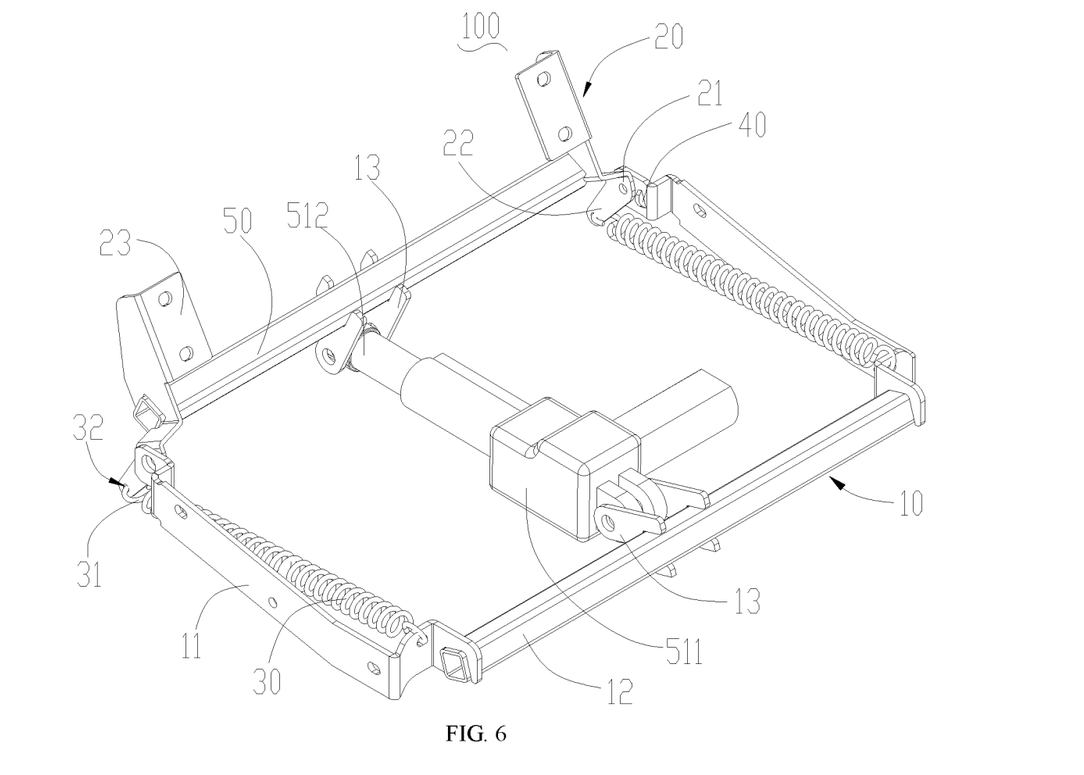
FIG. 6 is a structural schematic view of the headrest device of FIG. 1 in a lifting limiting position.
Figure 7:
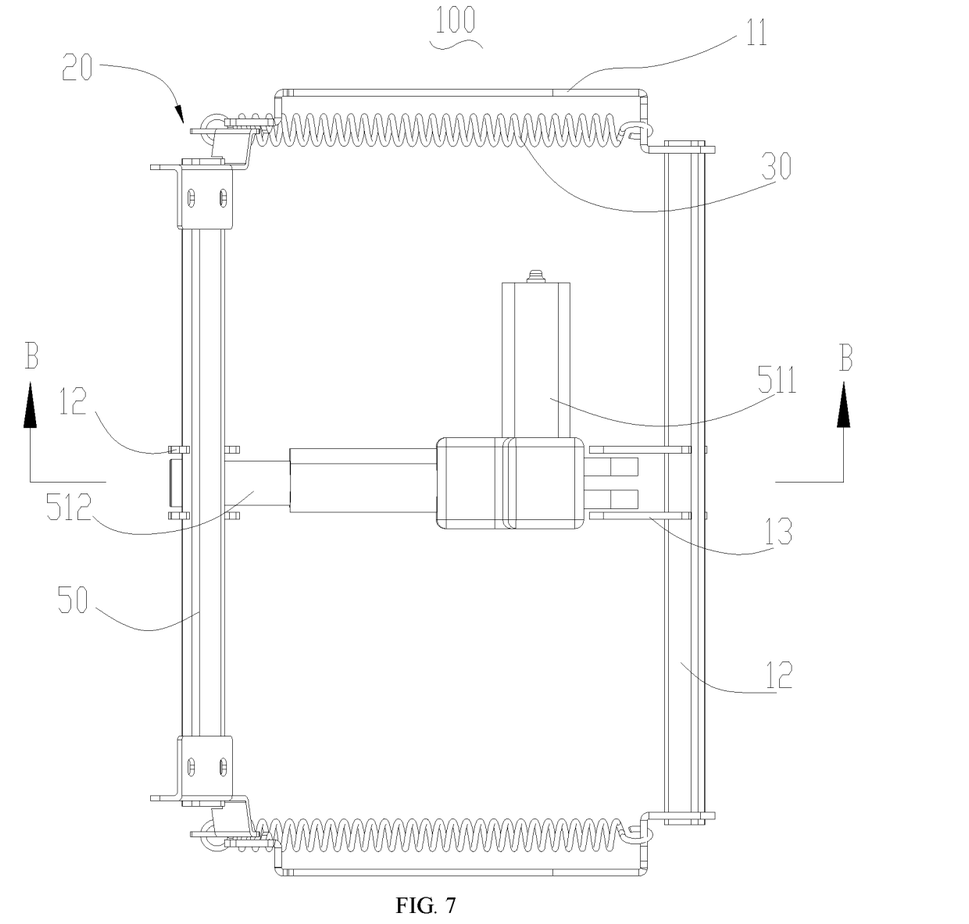
FIG. 7 is a structural schematic view of the headrest device of FIG. 6 in the first viewing angle.
Figure 8:
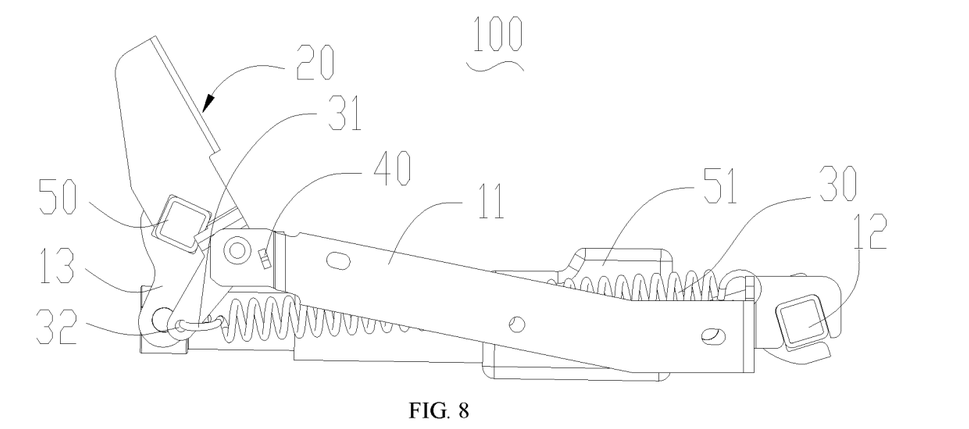
FIG. 8 is a structural schematic view of the headrest device of FIG. 6 in the second viewing angle.

With an action of the driving component, the whole headrest component 20 can rotate clockwise along an initial limiting position as shown in FIG. 4 to a lifting limiting position as shown in FIG. 8.

At the initial limiting position, an end close to the headrest component 20 of the boundary beam 11 is flush or parallel to the support plate on the mounting portion of the headrest plate 23. At this moment, both the headrest component 20 and the support frame 10 support the head, the shoulders and the neck of the user together. The headrest component 20 can bear the weight of the head of the user without lifting the head.

The lifting limiting position can be a position where the headrest component 20 has rotated relative to the support frame 10 with a maximum angle from the initial limiting position. At this moment, a lifting height and a lifting angle of the headrest component 20 to the head of the user reach a maximum state, and the lifting angle is an angle between the support plate and the end close to the headrest component 20 of the boundary beam 11.

Optionally, the mounting portion of the headrest plate 23, the first connecting portion 21 and the second connecting portion 22 are formed by a same plate after cutting and rolling bending. Stiffness and strength of the mounting portion of the headrest plate 23, the first connecting portion 21 and the second connecting portion 22 are significantly improved, with a greater bearing limiting, which can prevent deformation after long-term use, and a support effect for the head is stable and reliable.

The mounting portion of the headrest plate 23 and the headrest plate are further covered with a liner layer made of sponge, leather and other materials (not shown). The liner layer can increase a contact area between the head of the user and the headrest device 100, thus improving an inclusiveness of the headrest device 100 to the head and improving the comfort of the headrest component 20.

It can be understood that in other embodiments, the mounting portion of the headrest plate 23 can also be integrated with the headrest plate.

In order to ensure balanced force and reliable operation of the headrest device 100, a number of the headrest components 20 in this embodiment can be two sets. The two sets of the headrest components 20 are fixedly connected to both ends of the transmission member 50, respectively, and connected with the two boundary beams 11 of the support frame 10.

The driving component includes a first driving motor 51 acting as a direct power source to control the rotation of the headrest component 20 relative to the support frame 10. Two ends of the first driving motor 51 are connected with the bottom beam 12 and the transmission member 50, respectively.

Specifically, the first driving motor 51 can be a linear motor that can output linear motion, including a motor body 511 and an output shaft 512 that telescopically moves along an axial direction in the motor body 511. The motor body 511 is pivotally connected with the pivot seat 13 fixed on the bottom beam 12. An end away from the motor body 511 of the output shaft 512 is pivotally connected with the pivot seat 13 fixed on the transmission member 50.

It can be understood that in other embodiments, the first driving motor 51 can also be a motor that can produce rotary motion. At this moment, a cam connecting rod mechanism, a rack and pinion mechanism or other mechanisms can be disposed between the first driving motor 51 and the transmission member 50, the hydraulic motor or electric cylinder that can produce linear motion can also be used.

The transmission member 50 is rod-shaped, and two ends of the transmission member 50 are fixedly connected with the two headrest components 20, respectively. The pivot seat 13 is fixedly disposed between the two ends of the transmission member 50. Specifically, a cross-section shape of a transmission rod is rectangular on the plane perpendicular to an axial direction of the transmission rod. The two headrest components 20 are provided with a jack, respectively. Two ends of the transmission rod can penetrate through the two jacks, respectively. A shape of the jack is matched with the cross-section shape of the transmission rod, resulting in that the transmission rod and the headrest component 20 can stop rotation and be fixed.

In other embodiments, the cross-section shape of the transmission rod can be other non-circular shapes on the plane perpendicular to an axial direction of the transmission rod.

The reset member 30 is configured to drive the headrest component 20 to reset and rotate from the lifting limiting position to the initial limiting position, such that the headrest component 20 switching from a lifting and supporting state that relatively protruding the boundary beam 11 of the support frame 10 to a state that flush with an end of the boundary beam 11, resulting in that the headrest component 20 can be switched from the lifting and supporting state to a stable support state.

Optionally, the reset member 30 can be a telescopic spring. Two ends of the telescopic spring are connected with the second connecting portion 22 and the bottom beam 12, respectively. When the reset member 30 is in a stretched state, the reset member 30 has a tendency to drive the headrest component 20 to rotate to the initial limiting position. To facilitate installation, a hook portion 31 is formed at both ends of the reset member 30, and the bottom beam 12 and the second connection portion 22 are provided with a hook hole for the hook portion to penetrate through, respectively. This connecting mode can improve a connection reliability of the reset member 30, the headrest component 20 and the support frame 10, and prevent the reset member 30 from loosening.

It can be understood that in other embodiments, an end away from the second connection portion 22 of the reset member 30 can further be connected with the chair backrest as long as a restoring force is applied to the headrest component 20.

It should be noted that, in the embodiment, the first driving motor 51 is configured to elongate and drive the headrest component 20 to rotate from the initial limiting position to the lifting limiting position, so as to provide a driving force for the user to raise the head. When the power of the first driving motor 51 is suspended, the reset member 30 will exert a restoring force on the headrest component 20 that has reached the lifting limiting position, resulting in the headrest component 20 rotating along an opposite direction to the initial limiting position. It is easy to deduce that, when other embodiments adopt a driving motor with both elongation and contraction functions, the reset member 30 can also be omitted. A reciprocating switch between the initial limiting position and the lifting limiting position of the headrest component 20 can be realized by a reciprocating telescopic movement of the driving motor.

In a conventional headrest device, a limiting structure is disposed to limit a motion range and a limiting position of the conventional headrest device. However, the limiting structure has a complex shape, which leads to inconvenience in processing and assembly of parts of the conventional headrest device. Moreover, a strength of the limiting structure is insufficient. After repeated reciprocating movements of the headrest device, the limiting structure may be damaged or even failed. Therefore, a reliability of long-term use of the headrest device is poor, resulting in safety risks.

In the headrest device 100 in the present disclosure, the support frame 10 is provided with a limiting convex block 40 fixed to the support frame 10. The limiting convex block 40 of the support frame 10 can stop the headrest component 20 continuing to rotate, resulting in maintaining the headrest component 20 in the initial limit position.

The limiting convex blocks 40 are fixedly disposed on sides of the two boundary beams 11 close to each other, respectively, and close to a pivot position between the headrest component 20 and the boundary beam 11. The headrest component 20 is in contact with the limiting convex block 40 by the first connecting portion 21 or the second connecting portion 22.

Specifically, an outer edge of the first connecting part 21 has a cambered surface 211. When the headrest component 20 rotates relative to the support frame 10, the limiting convex block 40 always slides relative to the cambered surface 211 and forms a linear contact. The second connecting portion 22 is provided with an abutting surface 221. When the headrest component 20 rotates to the initial limiting position, a surface contact is formed between the abutting surface 221 and the limiting convex block 40, and the abutting surface 221 and the limiting convex block is relatively fixed.

In this way, in a process of the headrest component 20 rotating and reaching the initial limiting position, the limiting convex block 40 is smoothly relieved by the force of the headrest component 20. It can avoid an instantaneous impact of the headrest component 20 on the limiting convex block 40, so as to avoid a pulsating impact of the limiting convex block 40 and prevent a breaking, crushing deformation of the limiting convex block 40 or a loosening of the limiting convex block 40 relative to the support frame 10. Even if the headrest component 20 reciprocates for many times, the limiting convex block 40 will not be damaged.

Optionally, the cambered surface 211 can be a cylindrical surface with partial central angle, the abutting surface 221 can be planar, and a contact surface between the limiting convex block 40 and the headrest component 20 is planar. The cambered surface 211 is connected with and tangent to the abutting surface 221, and the cambered surface 211 and the abutting surface 221 have a smooth transition.

In this way, in a rotation process of the headrest component 20 relative to the support frame 10, a contact area between the headrest component 20 and the limiting convex block 40 is gradually changed from the cambered surface 211 to the abutting surface 221, which further reduces the force between the headrest component 20 and the limiting convex block 40. The first connecting portion 21 and the limiting convex block 40 can move smoothly and with low resistance relative to each other. Even if the headrest component 20 reciprocates for many times, a fatigue damage of the limiting convex block 40 will not occur. In addition, the headrest component 20 can support the head of the user more smoothly when the headrest component 20 reaches the initial limiting position.

Optionally, the limiting convex block 40 is welded and fixed on the boundary beam 11. In other embodiments, the limiting convex block 40 can also be fixed by fasteners, and the limiting convex block 40 can also be fixed on the boundary beam 11 by means of inserting and so on.

Furthermore, in an embodiment not shown in the figures, the limiting convex block 40 is provided with a flexible layer. The limiting convex block 40 is in contact with the headrest component 20 by the flexible layer.

In this way, the flexible layer can further cushion the force from the headrest component 20 to the limiting convex block 40, and reduce a noise generated by an impact on the limiting convex block 40 when the headrest component 20 reaches the initial limiting position, so as to further reduce a probability of the loosening of the limiting convex block 40 relative to the boundary beam 11, resulting in improving a durability of the limiting convex block 40 and the headrest device 100.

Furthermore, in an embodiment not shown in the figures, a fixed position of the limiting convex block 40 on the support frame 10 is adjustable. For example, the boundary beam 11 is provided with a plurality of matching holes for inserting and fixing the limiting convex block 40, or a plurality of through holes for fixing and connecting the fasteners.

In this way, more than one initial limiting position can be disposed for the headrest device 100, and a position where the limiting convex block 40 stops the headrest component 20 rotating can be adjusted according to habits of different users or user groups with different shapes and ages, respectively, resulting in that a smooth support height and a smooth support angle of the headrest component 20 relative to the support frame 10 can be adjusted.

The present disclosure further provides a chair including a chair backrest and the headrest device 100 provided in the present disclosure, and the headrest device 100 is fixed to the chair backrest by the support frame 10.

The present disclosure provides the headrest device 100. The headrest device 100 can block and stop the headrest component 20 which moves to the initial limiting position by the limiting convex block 40, and a blocking effect of the limiting convex block 40 is better. The headrest component 20 can more stably abut against the limiting convex block 40, so as to provide a stable and safe lifting support for the head of the user. Compared with the limiting structure of the conventional headrest device, the limiting convex block 40 is not easy to break off, crush and then fail, and has a better reliability. Structures of the headrest component 20 and the support frame 10 are simpler, parts of the headrest component 20 and the support frame 10 are easier to form, and an assembly of the headrest component 20 and the support frame 10 is more convenient, resulting in a production cost of the headrest device 100 being lower.

The technical features of the above-described embodiments may be combined in any combination. For the sake of brevity of description, all possible combinations of the technical features in the above embodiments are not described. However, as long as there is no contradiction between the combinations of these technical features, all should be considered as within the scope of this disclosure.

The above-described embodiments are merely illustrative of several embodiments of the present disclosure, and the description thereof is relatively specific and detailed, but is not to be construed as limiting the scope of the disclosure. It should be noted that a number of variations and modifications may be made by those skilled in the art without departing from the spirit and scope of the disclosure. Therefore, the scope of the disclosure should be determined by the appended claims.

I claim:

1. A headrest device, comprising a support frame, a headrest component and a reset member,
   wherein the support frame is pivotally connected with the headrest component, and the reset member is connected with the headrest component and configured to drive the headrest component to rotate relative to the support frame,
   the support frame is provided with a limiting convex block fixed to the support frame, the limiting convex block is configured to stop a rotation of the headrest component when the headrest component moves to an initial limiting position, and a position of the limiting convex block is adjustable on the support frame.

2. The headrest device of claim 1, wherein the headrest component comprises a first connecting portion pivotally connected with the support frame and a second connecting portion connected with the reset member, and the first connecting portion and the second connecting portion are relatively fixed with each other,
   the headrest component is in contact with the limiting convex block by the first connecting portion or the second connecting portion, the first connecting portion is capable of sliding contact with the limiting convex block, and the second connecting portion is capable of being in contact with the limiting convex block and fixed relative to the limiting convex block when the headrest component moves to the initial limiting position.

3. The headrest device of claim 2, wherein the first connecting portion is provided with a cambered surface configured to slide contact with the limiting convex block, the second connecting portion is provided with an abutting surface and the headrest component is in contact with the limiting convex block by the abutting surface in the initial limiting position.

4. The headrest device of claim 3, wherein the abutting surface is planar, and the abutting surface is connected with and tangent to the cambered surface.

5. The headrest device of claim 1, wherein the limiting convex block is further provided with a flexible layer and the flexible layer is in contact with the headrest component.

6. The headrest device of claim 1, wherein the limiting convex block is fixed on the support frame, or, the limiting convex block is inserted in and fixed to the support frame.

7. The headrest device of claim 1, wherein the reset member is a telescopic spring, an end of the reset member is provided with a hook portion, and the headrest component is provided with a hook hole for the hook portion to penetrate through.

8. The headrest device of claim 1, wherein the headrest device further comprises a driving component disposed on the support frame, and the driving component is connected with the headrest component and configured to drive the headrest component to rotate relative to the support frame.

9. A chair, comprising a chair backrest and the headrest device of claim 1, wherein the headrest device is fixed to the chair backrest by the support frame.

10. The chair of claim 9, wherein the headrest component comprises a first connecting portion pivotally connected with the support frame and a second connecting portion connected with the reset member, and the first connecting portion and the second connecting portion are relatively fixed with each other,
    the headrest component is in contact with the limiting convex block by the first connecting portion or the second connecting portion, the first connecting portion is capable of sliding contact with the limiting convex block, and the second connecting portion is capable of being in contact with the limiting convex block and fixed relative to the limiting convex block when the headrest component moves to the initial limiting position.

11. The chair of claim 10, wherein the first connecting portion is provided with a cambered surface configured to slide contact with the limiting convex block, the second connecting portion is provided with an abutting surface and the headrest component is in contact with the limiting convex block by the abutting surface in the initial limiting position.

12. The chair of claim 11, wherein the abutting surface is planar, and the abutting surface is connected with and tangent to the cambered surface.

13. The chair of claim 9, wherein the limiting convex block is further provided with a flexible layer and the flexible layer is in contact with the headrest component.

14. The chair of claim 9, wherein the limiting convex block is fixed on the support frame, or, the limiting convex block is inserted in and fixed to the support frame.

15. The chair of claim 9, wherein the reset member is a telescopic spring, an end of the reset member is provided with a hook portion, and the headrest component is provided with a hook hole for the hook portion to penetrate through.

16. The chair of claim 9, wherein the headrest device further comprises a driving component disposed on the support frame, and the driving component is connected with the headrest component and configured to drive the headrest component to rotate relative to the support frame.

\* \* \* \* \*